(12) United States Patent
Cross et al.

(10) Patent No.: US 9,249,834 B2
(45) Date of Patent: Feb. 2, 2016

(54) SEAL ASSEMBLY FOR BEARINGS (71) Applicant: DEERE & COMPANY, Moline, IL (US)

(72) Inventors: Jacob W. Cross, Ankeny, IA (US); Richard J. Connell, Slater, IA (US); Mark D. Beeck, Ankeny, IA (US); Jeremy D. Krantz, Polk City, IA (US); Philip D. Cox, Polk City, IA (US); Greg T. Buse, Johnston, IA (US); Jarrod R. Ruckle, Bondurant, IA (US)

(73) Assignee: DEERE & COMPANY, Moline, IL (US)

( * ) Notice: Subject to any disclaimer, the term of this patent is extended or adjusted under 35 U.S.C. 154(b) by 22 days.

(21) Appl. No.: 14/272,003

(22) Filed: May 7, 2014

(65) Prior Publication Data
US 2015/0323012 A1 Nov. 12, 2015

(51) Int. Cl.
F16C 13/00 (2006.01)
F16C 33/76 (2006.01)
F16C 33/78 (2006.01)
A01B 76/00 (2006.01)

(52) U.S. Cl.
CPC ............. *F16C 33/7823* (2013.01); *A01B 76/00* (2013.01)

(58) Field of Classification Search
CPC . A01B 71/04; F16C 33/7853; F16C 33/7859; F16C 33/7863; F16C 33/7866; F16C 33/7879; F16C 33/7883; F16C 33/7896; F16J 15/16; F16J 15/32; F16J 15/3204; F16J 15/1232; F16J 15/1236; F16J 15/1248; F16J 15/1252; F16J 15/1268

USPC .......................... 384/157, 460, 481, 482, 486
See application file for complete search history.

(56) References Cited

U.S. PATENT DOCUMENTS

| 3,111,351 A | 11/1963 | Tanke |
| 3,706,345 A | 12/1972 | Patterson et al. |
| 3,792,912 A | 2/1974 | Howe et al. |
| 3,932,006 A | 1/1976 | Tertinek et al. |
| 4,392,695 A * | 7/1983 | Miller ........................... 384/477 |
| 4,492,272 A | 1/1985 | Jensen |
| 4,699,526 A | 10/1987 | Sato |
| 7,073,949 B2 | 7/2006 | Ruckle et al. |
| 2003/0201108 A1 | 10/2003 | Linden et al. |
| 2011/0255812 A1 | 10/2011 | Connell et al. |

FOREIGN PATENT DOCUMENTS

EP 785368 A2 * 7/1997 .......... F16C 33/7859

* cited by examiner

*Primary Examiner* — Phillip A Johnson (57) ABSTRACT

A seal assembly is disclosed for a bearing having first ring with a first inner surface, a second ring with a second inner surface, and at least one bearing member disposed between the first and second inner surfaces. An exterior seal with a first plurality of lips is attached to an exterior backing, the exterior backing engaging the first ring of the bearing to hold the first plurality of lips against the second inner surface of the second ring. An interior seal with a second plurality of lips is attached to an interior backing, the interior backing engaging the second ring of the bearing to hold the second plurality of lips against the first inner surface of the first ring. The second plurality of lips may be configure differently than the first plurality of seal lips. The interior backing may be oriented between the exterior seal and the interior seal.

20 Claims, 9 Drawing Sheets

SEAL ASSEMBLY FOR BEARINGS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

The present disclosure relates generally to seal assemblies for bearings, including seal assemblies for ball bearings.

BACKGROUND OF THE DISCLOSURE

In certain instances, various bearings (e.g., ball bearings of various configurations) may be configured with seals to help retain lubricant inside the bearing and to act as shields to prevent dirt and other contaminants from entering the bearing. In certain configurations, for example, lip seals made from rubber (or other flexible material) may be utilized to protect a particular bearing, with one or more lips on a seal body contacting a portion of the bearing to provide a seal. In various configurations, multiple lip seals may be provided for a single bearing, with existing seals typically utilizing the same lip configuration for each seal included in a seal assembly for a bearing. This may not provide an optimal seal for various operations.

For example, in agricultural operations involving significant residue and soil displacement (e.g., various tillage operations) existing seals and seal assemblies may not adequately protect bearings from adverse fouling and wear. Various machinery may be affected by this deficiency, including disc-gang bearings for tillage machines, which may frequently suffer premature failure due to insufficient sealing. As a result, regular and time-consuming maintenance, including greasing of disc-gang (or other) bearings and flushing of contaminates, may be widely employed.

SUMMARY OF THE DISCLOSURE

A seal assembly for a bearing is provided to retain lubricant within the bearing and otherwise protect the bearing from wear and fouling.

According to one aspect of the disclosure, a bearing is provided having a first ring, a second ring, and a bearing member disposed between the first and second rings. An exterior seal attached to an exterior backing plate includes a first plurality of lips. The exterior backing plate engages the first ring of the bearing to hold the first plurality of lips against the second ring, the exterior backing plate extending from the first ring past a portion of the second ring to provide additional protection against contamination. An interior seal includes a second plurality of lips configured differently from the first plurality of lips and is attached to an interior backing plate, the interior seal and the backing plate being oriented between the exterior seal and the bearing member. The interior backing plate engages the second ring to hold the second plurality of lips against the first ring.

In certain embodiments, an additional exterior seal and backing plate, and an additional interior seal and backing plate may be oriented on an opposite side of the bearing member, to provide a two-sided seal for the bearing. The rings may include various shoulders or grooves, and portions of the backing plates may be deformable, in order to assist in securing the backing plates to the rings.

In certain embodiments, a smaller number of lips may be included on the exterior seal than are included on the interior seal. One or more lips on the exterior seal may be thicker, along an axial direction from the perspective of the bearing, than one or more lips on the interior seal.

According to another aspect of the disclosure, a bearing is provided having a first ring, a second ring, and a bearing member disposed between the first and second rings. An exterior seal is attached to an exterior backing plate with an annular body, which engages the first ring with a press-fit connection to hold the exterior seal against the second ring. The exterior backing plate extends from the first ring past a portion of the second ring to provide additional protection against contamination. An interior seal is attached to an interior backing plate, the interior backing plate being oriented between the exterior seal and both of the interior seal and the bearing member. The interior backing plate includes an annular body, which engages the second ring with a press-fit connection to hold the interior seal against the first ring.

The details of one or more implementations of the disclosure are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example implementations of the disclosed seal assembly, as shown in the accompanying figures of the drawings described briefly above.

As noted above, it may be useful to provide a seal assembly to assist in retaining lubrication within a bearing (e.g., a ball bearing) and preventing external dirt, debris, or other contaminants from entering the bearing. Such an assembly may be useful, for example, in various agricultural applications in which rotating machinery (e.g., tillage blades) may be exposed to high levels of disturbed soil, residue, and other contaminants.

In certain embodiments, a seal assembly for this purpose may include a set of two seals on each side of a bearing. One of the two seals in each set may be an interior seal, being oriented closer to the bearing member (e.g., the ball(s) of a ball bearing), while the other of the two seals may be an exterior seal, being oriented farther from the bearing member. With such a redundant seal arrangement, the exterior seal may provide a first barrier to the entry of contaminants into the bearing, with the interior seal providing a second barrier between the exterior seal and the bearing. Similarly, the interior seal may provide a first barrier to leakage of lubrication from the bearing, with the exterior seal providing a second barrier between the interior seal and the surroundings.

The interior and exterior seals may be configured in a variety of ways, including as seals with annular bodies. In certain embodiments, a plurality of lips may extend from the annular bodies to contact various surfaces of the bearing and thereby provide a seal against lubrication leakage and contaminant entry. In certain embodiments, it may be beneficial to configure the lips for one of the seals differently from the lips for the other of the seals. For example, the exterior seal may be configured to include two or fewer lips, while the interior seal may be configured to include three or more lips. Further, one or more lips of one seal (e.g., the external seal) may be configured to be generally thicker than the lips of the other seal (e.g., the internal seal).

In certain embodiments, the interior and exterior seals may be held in place, respectively, by interior and exterior backing plates. Such backing plates, for example, may be metal plates that are attached to the respective seals and are configured to include various contours. In certain embodiments, the backing plates may engage a portion of the bearing (e.g., a first or second bearing ring or race) via a snap-fit connection. In certain embodiments, portions of the backing plates may be deformable in order to further secure the backing plates (and the seals) to the bearing. For example, a portion of the backing plates may be deformable to extend into one or more grooves on the bearing rings once the backing plates are in position.

In certain embodiments, the backing plates themselves may also provide a barrier to the entry of contaminants into and the leakage of lubrication from the bearing. For example, the backing plate for the exterior seal may extend from one ring of the bearing (e.g., an inner ring) past a surface of the other ring of the bearing (e.g., an outer ring) an additional protective barrier for the bearing. Similarly, the backing plate for the interior seal may extend from one ring of the bearing (e.g., an outer ring) past a surface of the other ring of the bearing (e.g., an inner ring) to provide an additional protective barrier for the bearing.

Figure 1:
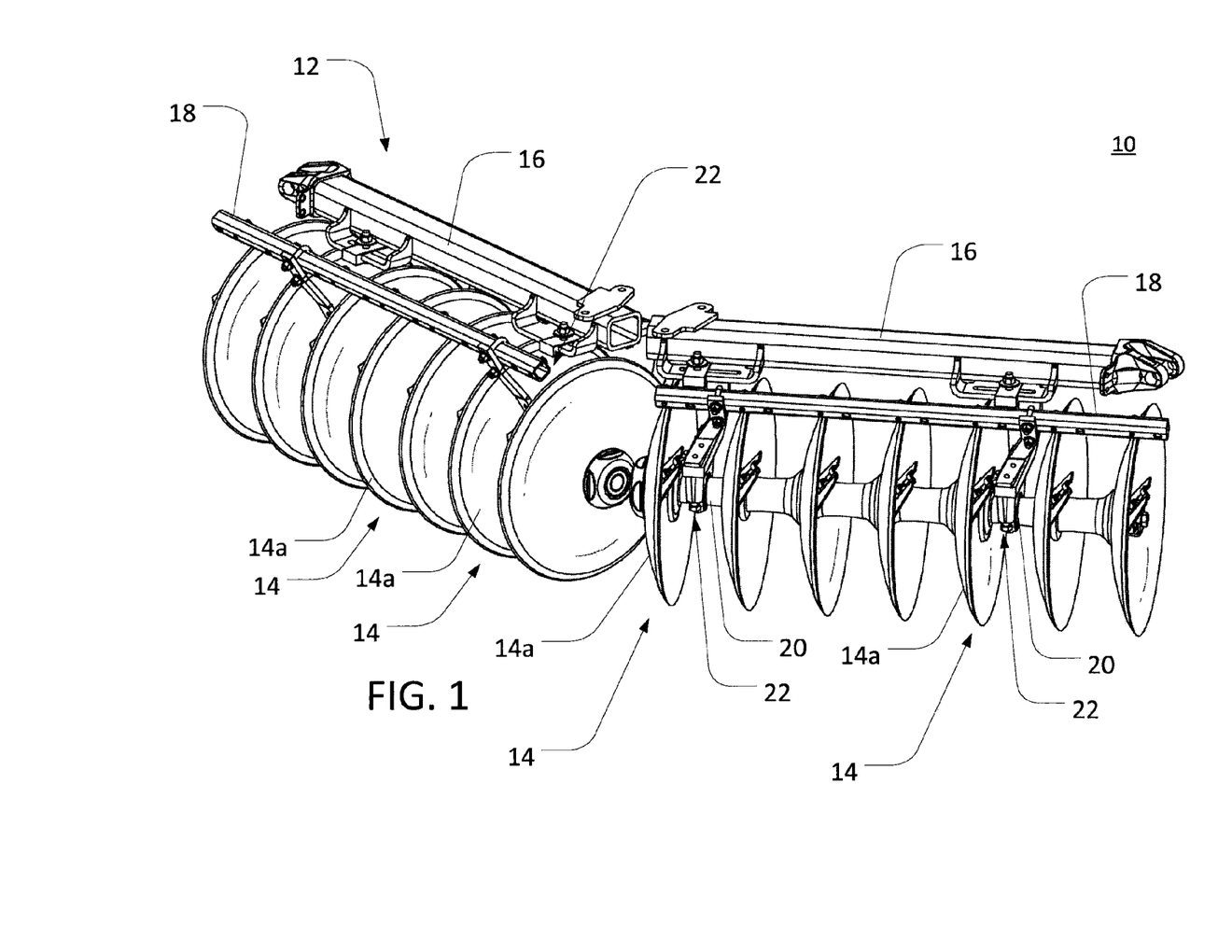
FIG. 1 is a perspective view of a portion of a tillage implement having disc blade assemblies supported by converging gang tubes.

The disclosed seal assembly may be implemented with respect to a variety of rotating machinery, including various agricultural implements. For example, referring now to FIG. 1, tillage implement 10 is depicted having a frame 12 that supports a plurality of disc blade assemblies 14. Frame 12 may include a pair of angled structural tubes 16, each supporting a gang tube 18. Spool 20 may be disposed between each disc blade assembly 14 in order to separate disc blade assemblies 14 from each other and to rotatably mount disc blade assemblies 14 to gang tubes 18 at disc supports 22. In practice, tillage implement 10 may be pulled behind a tractor (not shown) or other work vehicle, so that the disc blade assemblies 14, collectively referred to as a gang of discs, may be used to till a field.

Referring also to FIGS. 2-5, example disc support 22a may include C-member 30 supporting bearing assembly 32. Bearing assembly 32 may include upper bearing cap 34 and lower bearing cap 36, which may together define cavity 38 (see FIG. 4) to house ball bearing 40. (Various examples herein may include ball bearing 40. It will be understood, however, that the disclosed seal may also be utilized with various other bearing types including roller bearings, spherical ball bearings, and so on.) Disc spring 42 may be positioned adjacent to one side of bearing assembly 32, and spool 20a may be positioned adjacent to the other side of bearing assembly 32. Spool 20a may include generally tubular portion 46 and flared portion 48 of spool 20a, with generally cylindrical opening 44 extending through portions 46 and 48.

Figure 2:
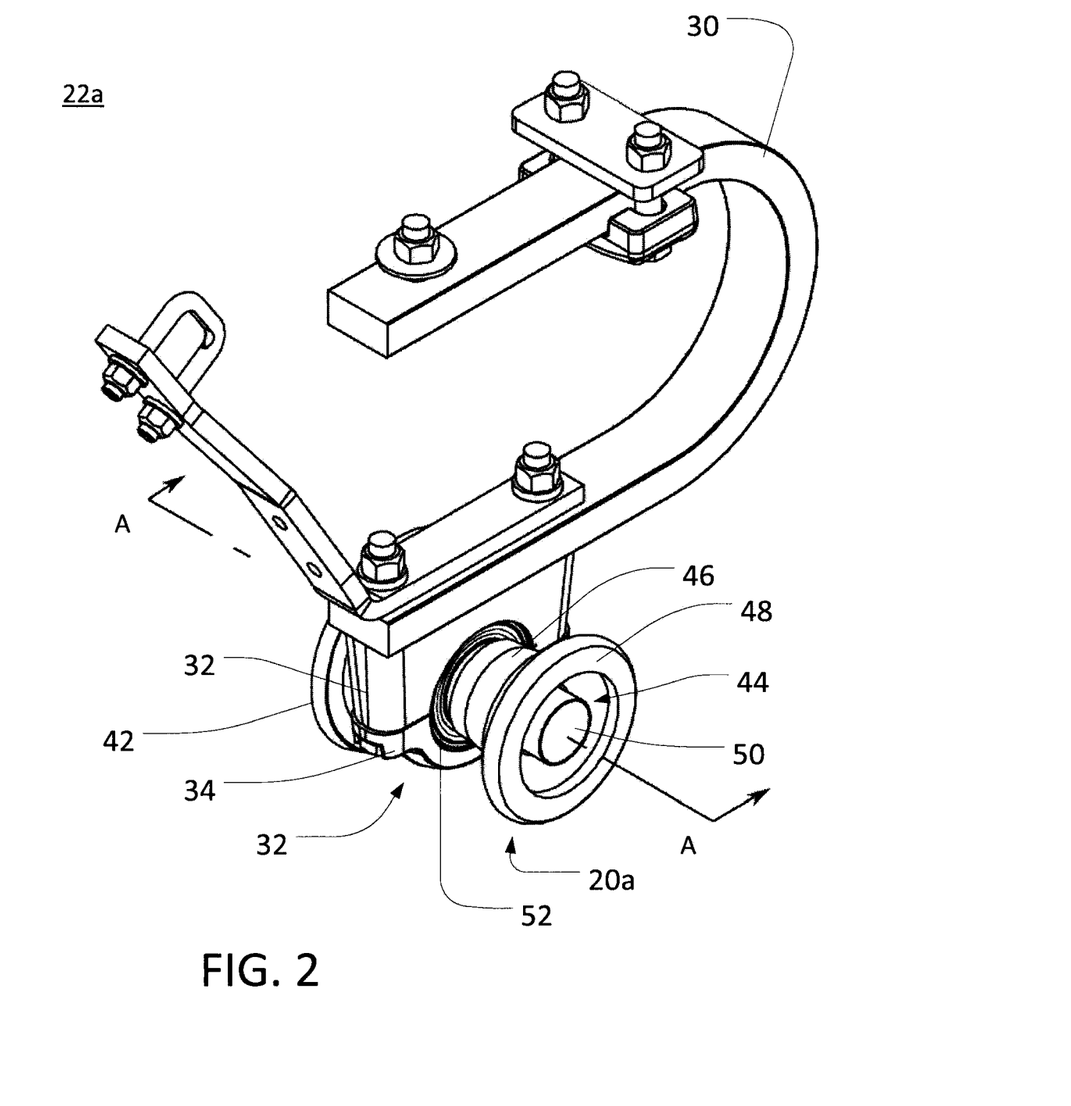
FIG. 2 is a perspective view of a disc support for the tillage implement of FIG. 1, including a seal assembly for a bearing.
Figure 3:
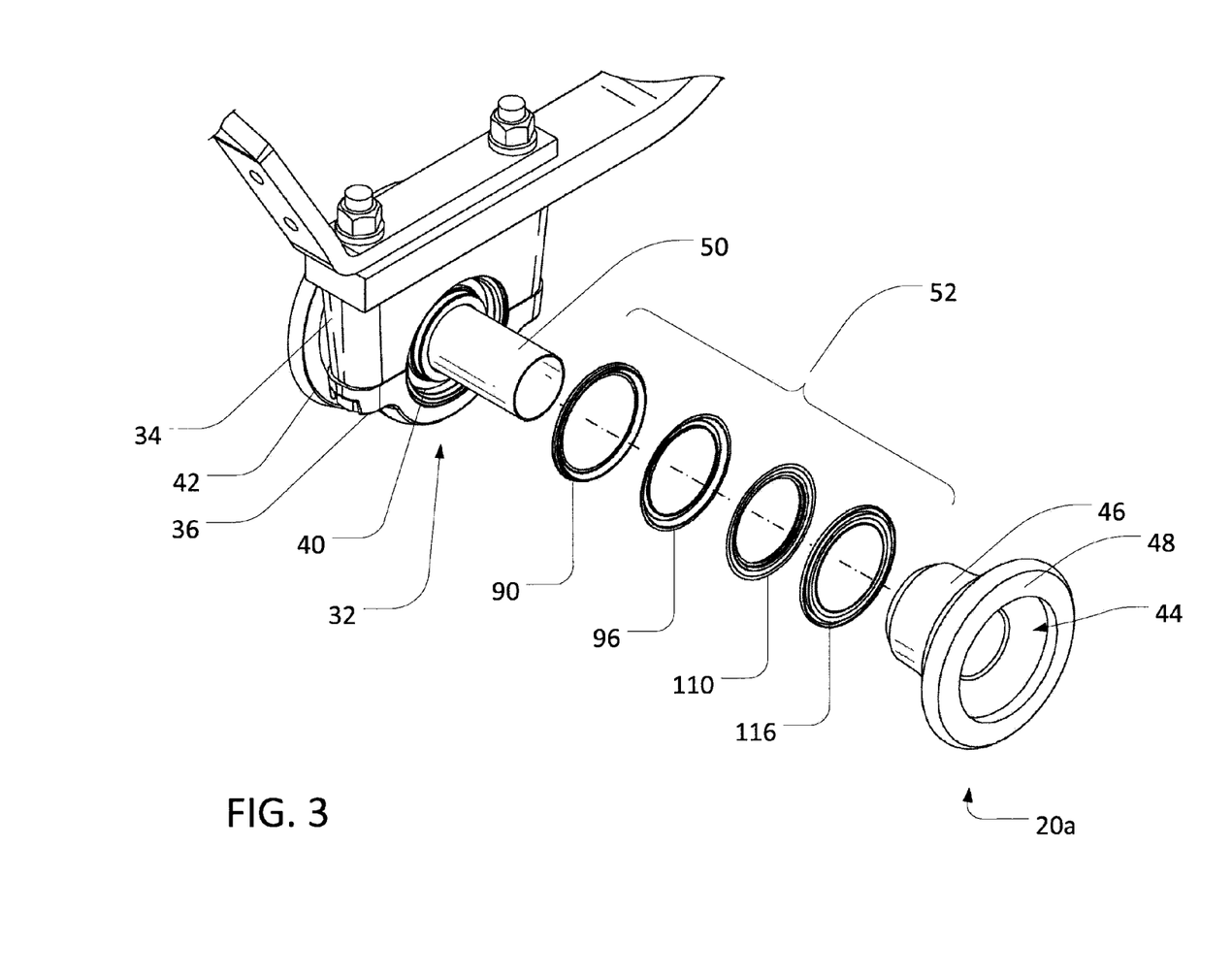
FIG. 3 is an exploded view of a portion of the seal assembly of FIG. 2.
Figure 4:
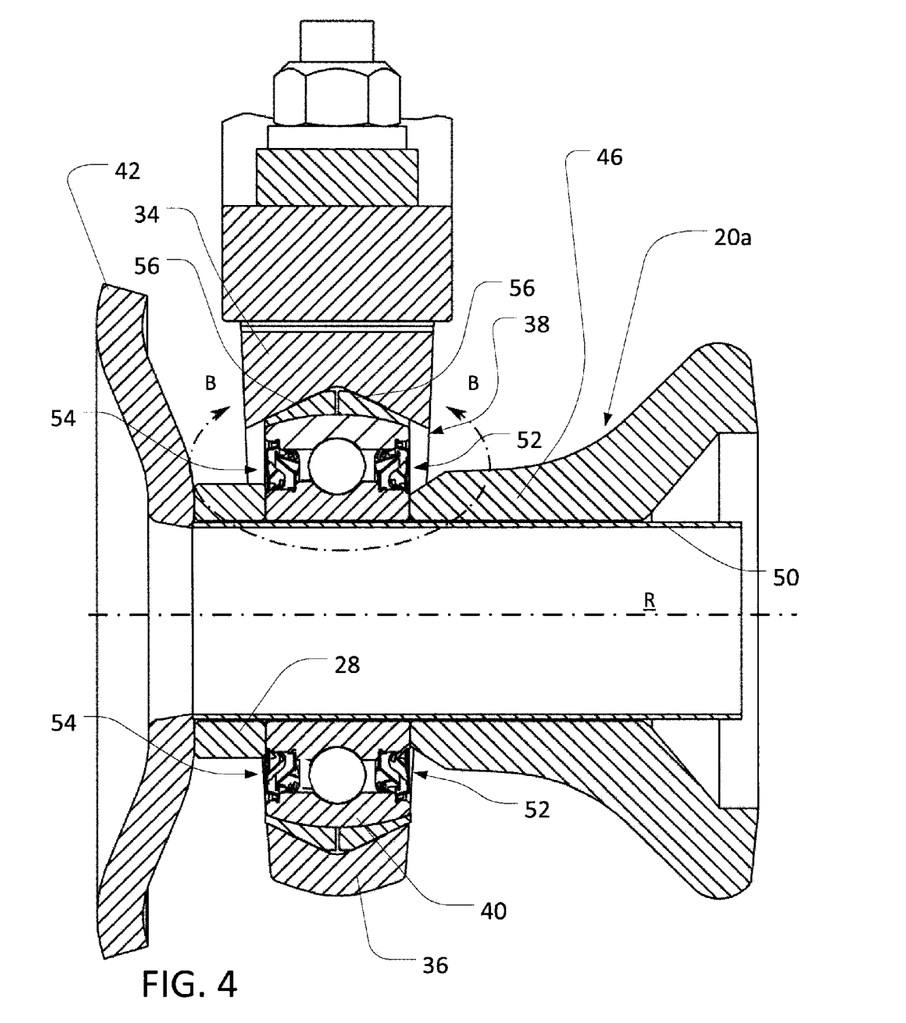
FIG. 4 is a sectional view of the disc support of FIG. 2, including the seal assembly, taken along plane A-A of FIG. 2.

In order to allow rotation of discs 14a of disc blade assembly 14, discs 14a may be mounted to a rotating member supported by bearing 40. In certain embodiments, a cylindrical support member, such as hollow sleeve 50, may be inserted through opening 44 of spool 20a and extend through bearing 40 (within cavity 38) and spacer 28 to disc spring 42. With sleeve 50 engaged with a portion of bearing 40 (as described in greater detail below), bearing 40 may allow hollow sleeve 50 (and discs 14a) to rotate relatively freely within cavity 38, while also supporting sleeve 50 (and discs 14a) with respect to frame 12, via bearing assembly 32 and C-member 30.

Figure 5:
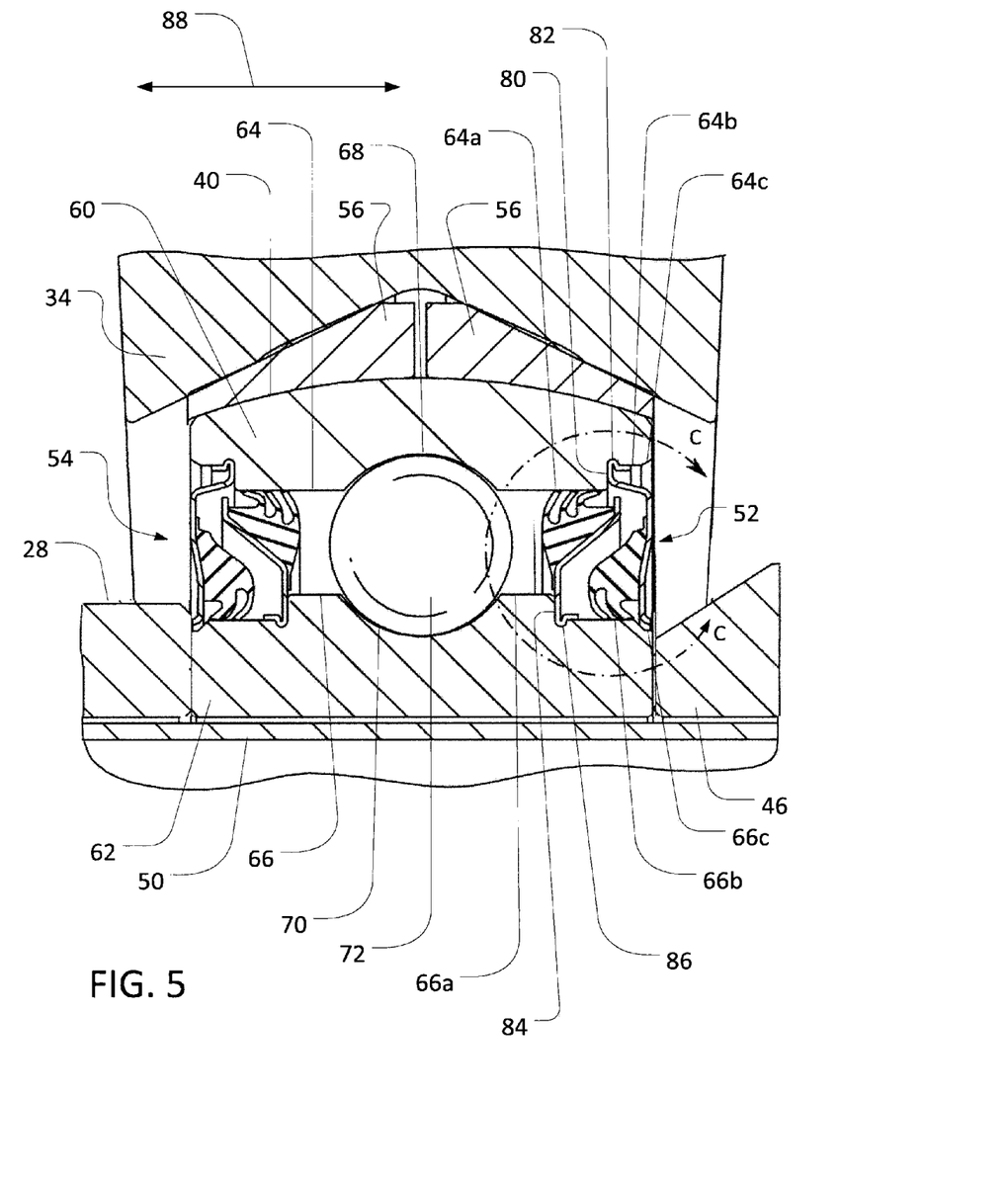
FIG. 5 is an enlarged sectional view of the region B-B of FIG. 4, including the seal assembly of FIG. 2.

Referring in particular to FIG. 5, ball bearing 40 may include generally annular outer ring (or race) 60 engaged with bearing caps 34 and 36, and may also include generally annular inner ring (or race) 62 engaged with hollow sleeve 50. (It will be understood that various of the features depicted in FIG. 5 and other figures, including bearing 40, rings 60 and 62, and so on, may exhibit radial symmetry. As such, the depicted cross-sections of various features in these figures may be characteristic of the cross-section of these features at various other points around their circumference.) Outer ring 60 may be seated against bearing liners 56 within cavity 38 and, accordingly, may be generally stationary with respect to bearing caps 34 and 36. Rings 60 and 62 may include, respectively, bearing surfaces 64 and 66 with annular grooves 68 and 70, within which one or more bearing members (e.g., ball 64 and various other similar balls (not shown)) may be seated. In this way, through the rotation of the various bearing members (e.g., ball 64 and others), ring 62 may freely rotate around axis R (see FIG. 4) within ring 60. Accordingly, hollow sleeve 50 (as well as spool 20a, spacer 28 and disc spring 42) may also rotate relatively freely with respect to outer ring 60.

In certain embodiments, one or both of rings 60 and 62 may be designed to be generally thicker than standard industry bearing rings, including by a factor of 50% or more. For example, a first standard bearing may include an inner bore diameter of between 50 and 60 mm (e.g., 55.75 mm) and an outer ring diameter of approximately 95 to 105 mm (e.g., 100 mm), providing a bearing ring thickness of approximately 4 mm, measured at the axial center of the bearing from the edge of a bearing ball to the outer or inner bearing diameter. A second standard bearing may include an inner bore diameter of between 50 and 60 mm (e.g., 55 mm) and an outer bearing diameter of approximately 115 to 125 mm (e.g., 120 mm), providing a bearing ring thickness of approximately 8 mm, measured at the axial center of the bearing from the edge of a bearing ball to the outer or inner bearing diameter. In heavily loaded applications (e.g., disking operations in rocky soil), thicker rings than are provided by the first standard bearing noted above may be desired for enhanced bearing durability and other benefits. However, the second standard bearing noted above may not exhibit appropriate dimensions to be easily mounted in disc blade assembly 14. Accordingly, bearing 40 may be configured to have a similar inner diameter as either of the standard bearings noted above (e.g., 55.75 mm), but an outer diameter of between 100 mm and 120 mm (e.g., 115 mm). In this way, bearing 40 may be used with disc blade assembly 14 without unnecessary modifications to the assembly 14, while also providing generally thicker rings to support more heavily loaded applications. In certain embodiments, bearing 40 may include bearing balls sized for the second standard bearing noted above (or others).

In certain embodiments, outer ring 60 of bearing 40 may exhibit a thickness of between 4 mm and 8 mm (e.g., approximately 6.6 mm), measured from the edge of a bearing ball to the outer bearing diameter at the axial center of the bearing. In certain embodiments, inner ring 62 may exhibit a thickness of between 4 mm and 8 mm (e.g., approximately 7.2 mm), measured from the edge of a bearing ball to the outer bearing diameter at the axial center of the bearing. This may increase the overall load rating for bearing 40 by 20% or more versus standard bearings also sized to fit disc blade assembly 14 (based on International Organization for Standardization ("ISO") 76 and ISO 281 calculation guidelines). Such a design, therefore, may result in bearing 40 being well suited to agricultural disking operations, and other heavily-loaded and high-contamination applications.

Due to the potential presence of dirt, debris or other contaminants in the surroundings, as well as the need to retain lubrication within bearing 40, various seal sets 52 and 54 may be utilized with bearing 40. Seal set 52, for example, may be coaxially aligned with hollow sleeve 50, and may be generally engaged with one side of bearing 40 to retain lubrication and exclude contaminants at that side of bearing 40. Similarly, seal set 54, which may be substantially similar to seal set 52, may be coaxially aligned with hollow sleeve 50, and may be generally engaged with the other side of bearing 40 to retain lubrication and exclude contaminants at that side of bearing 40.

In order to retain seal set 52 (and seal set 54) and so that seal set 52 (and seal set 54) provides an optimal seal, bearing 30 may include various additional features. In certain embodiments, bearing surface 64 of outer ring 60 may include shoulder 80, which may generally divide the right side (from the perspective of FIG. 5) of bearing surface 64 into interior portion 64a and exterior portion 64b, where exterior portion 64b is farther from inner ring 62 than interior portion 64a. In certain embodiments, annular groove 82 may be provided in portion 64b of bearing surface 64 in a location that is generally adjacent to shoulder 80. Annular groove 64c may also be included at the exterior edge of outer ring 60, in various embodiments.

Similarly, bearing surface 66 of inner ring 62 may include shoulder 84, which may generally divide the right side (from the perspective of FIG. 5) of bearing surface 66 into interior portion 66a and exterior portion 66b, where exterior portion 66b is farther from outer ring 60 than interior portion 66a. In certain embodiments, annular groove 86 may be provided in portion 66b of bearing surface 66 in a location that is generally adjacent to shoulder 84. Annular groove 66c may also be included at the exterior edge of inner ring 62, in various embodiments As depicted in the various figures, bearing 40 may be generally symmetrical with respect to axial direction 88. Accordingly, for example, a shoulder may also be provided on the left side (from the perspective of FIG. 5) of each of bearing surfaces 64 and 66, with a first annular groove on each of surface 64 and 66 at a location that is generally adjacent to the shoulders and another annular groove near the left-side exterior edges of rings 60 and 62. It will be understood, however, that bearing 40 (or portions thereof) need not necessarily exhibit axial symmetry, and that different features or geometry may be included on either side of bearing 40 for the engagement of seal sets 52 or 54.

Figure 6:
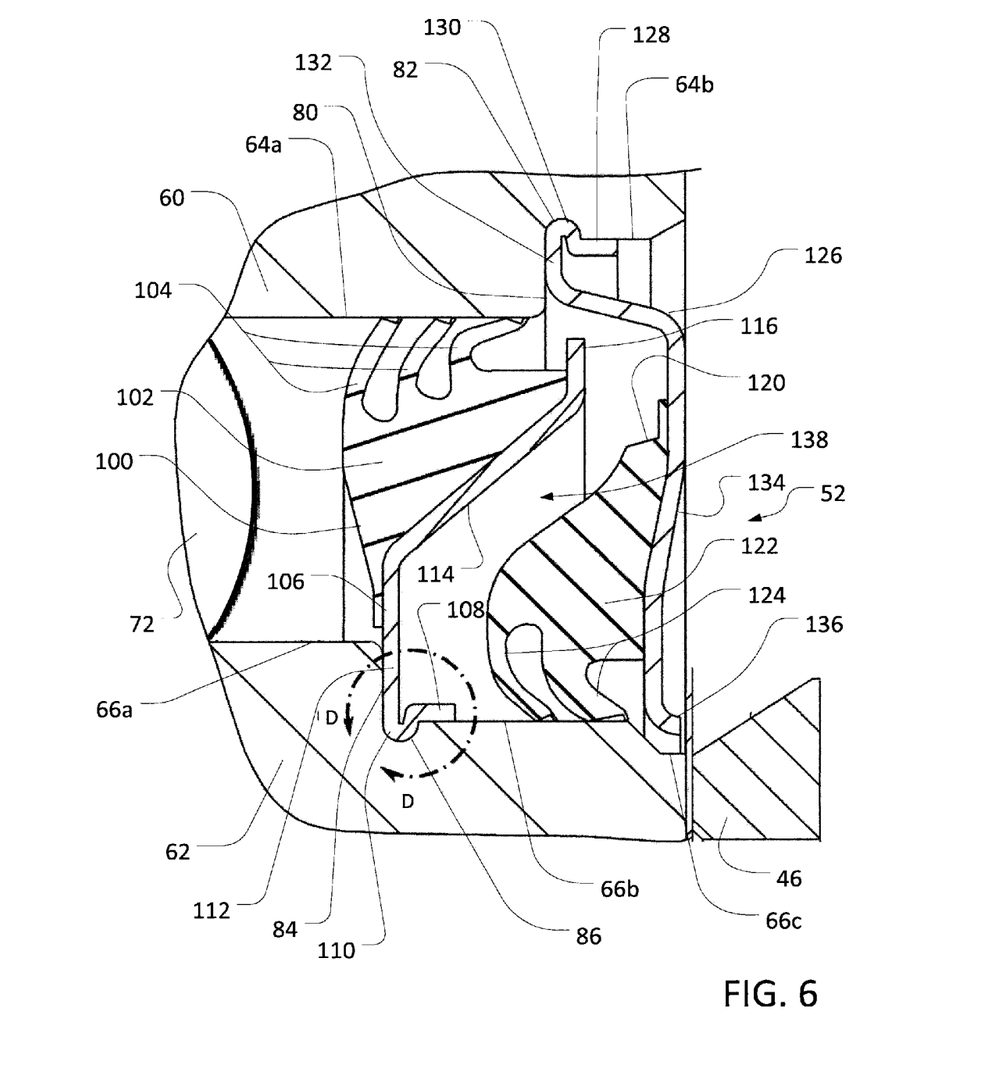
FIG. 6 is an enlarged sectional view of the region C-C of FIG. 5, including a portion of the seal assembly of FIG. 2.

Referring now to FIG. 6, various features of seal set 52 are depicted, which may assist in the sealing of the right side (from the perspective of FIG. 6) of bearing 40. It will be understood that similar features may additionally (or alternatively) be included in various embodiments of seal set 54 for the sealing of the left side of bearing 40. In certain embodiments, seal set 52 may include interior seal 100. Interior seal 100 may be formed as an annular seal of injection molded or bonded rubber, or other suitable material. Interior seal 100 may include seal body 102, from which various seal lips 104 may extend to contact outer ring 60 (e.g., at surface 64a) and thereby provide a seal against passage of lubrication out of, or contaminants into, the interior of bearing 40 (e.g., the area around ball 72). In certain embodiments, lips 104 may deform as they contact outer ring 60 (e.g., at surface 64a) in order to provide an appropriate seal.

Interior seal 100 may be mounted to and generally held in place with respect to bearing 40 by interior backing 106. Interior backing 106 may be an annular backing member formed of a stamped steel plate or other suitable material. Engagement portion 108 of interior backing 106 may extend in a generally axial and outward direction and may be designed to provide a press-fit connection with inner ring 62 (e.g., at surface 66b) in order to retain interior backing 106 in place on bearing 40. In certain embodiments, engagement portion 108 may include deformable portion 110 (or a similarly oriented rigid portion with a radially protruding profile) which, as described in greater detail below, may be deformed during installation of interior backing 106 to extend into groove 86 and thereby further secure interior backing 106 to bearing 40.

Continuing, contact portion 112 of interior backing 106 may extend (e.g., radially) inwardly from engagement portion 108 and may be seated against shoulder 84 when interior backing 106 is appropriately installed. Seal-mount portion 114 may extend from contact portion 112 to free end 116 and may provide an attachment surface for mounting body 102 of interior seal 100 to interior backing 106. In certain embodiments, seal-mount portion 114 may define a generally frustoconical portion of interior backing 106 extending radially and axially outward toward free end 126, with free end 126 extending radially outward from portion 114. It will be understood, however, that various other configurations may be possible.

It will be noted that free end 116 does not attach to outer ring 60, which may allow interior backing 106 (and interior seal 100) to co-rotate with outer ring 62 and interior seal 100 to move along surface 64a. In this regard, it will also be understood that various features of interior seal 100 (e.g., one or more of seal lips 104) may contact various other surfaces in addition (or as an alternative) to surface 64a. For example, one or more of seal lips 104 may extend over shoulder 80, may contact a portion of exterior backing 126, or may contact various other surfaces associated with bearing 40.

In certain embodiments, seal set 52 may further include exterior seal 120, which may be separated from interior backing 114 by gap 138. Exterior seal 120 may be formed as an annular seal of injection molded or bonded rubber, or other suitable material. Exterior seal 120 may include seal body 122, from which various seal lips 124 may extend to contact inner ring 62 (e.g., at surface 66b) and thereby provide a seal against passage of lubrication out of, or contaminants into, the interior of bearing 40. In certain embodiments, lips 124 may deform as they contact inner ring 62 (e.g., at surface 66*b*) in order to provide an appropriate seal.

Exterior seal 120 may be mounted to and generally held in place with respect to bearing 40 by exterior backing 126. Exterior backing 126 may be an annular backing member formed of a stamped steel plate or other suitable material. Engagement portion 128 of exterior backing 126 may extend in a generally axial and outward direction and may be designed to provide a press-fit connection with outer ring 60 (e.g., at surface 64*b*) in order to retain exterior backing 126 in place on bearing 40. In certain embodiments, engagement portion 128 may include deformable portion 130 (or a similarly oriented rigid portion with a radially protruding profile) which, as described in greater detail below, may be deformed during installation of exterior backing 126 to extend into groove 82 and thereby further secure exterior backing 126 to bearing 40.

Continuing, contact portion 132 of exterior backing 126 may extend (e.g., radially) inwardly from engagement portion 128 and may be seated against shoulder 80 when exterior backing 126 is appropriately installed. Seal-mount portion 134 may extend from contact portion 132 to free end 136 and may provide an attachment surface for mounting body 102 of interior seal 100 to interior backing 106. In certain embodiments, seal-mount portion 114 may define be oriented axially outward from contact portion 80 in order to provide sufficient clearance between exterior seal 120 and interior backing 106. Further, in certain embodiments, free end 136 may include a curved portion extending axially outward from attachment portion 134, which may, for example, provide a point of access for removal of exterior backing 126 (and exterior seal 120). It will be understood, however, that various other configurations may be possible.

It will be noted that free end 136 does not attach to inner ring 62, which may allow interior backing 106 (and exterior seal 120) to remain stationary with outer ring 60 as surface 66*b* rotates past exterior seal 120. In this regard, it will also be understood that various features of exterior seal 120 (e.g., one or more of seal lips 124) may contact various other surfaces in addition (or as an alternative) to surface 66*b*. For example, one or more of seal lips 124 may extend into groove 66*c*, may contact a portion of interior backing 106, or may contact various other surfaces associated with bearing 40.

In certain embodiments, in order to provide a further impediment to passage of contaminants (or lubrication) one or both of interior 106 and exterior 126 backings may extend at free ends 116 and 136, respectively, past a surface of the opposing ring 60 or 62. For example, as depicted in FIG. 6, free end 136 of exterior backing 126 extends into groove 66*c* on inner ring 62. As such, free end 136 extends past surface 66*a* of ring 62 and past surface 66*b* of ring 62 to provide an additional impediment to the entry of contaminants into bearing 40. In certain embodiments, free end 116 may similarly extend (not shown in FIG. 6) past a surface of outer ring 60 (e.g., surface 64*a*).

Figures 7A, 7B:
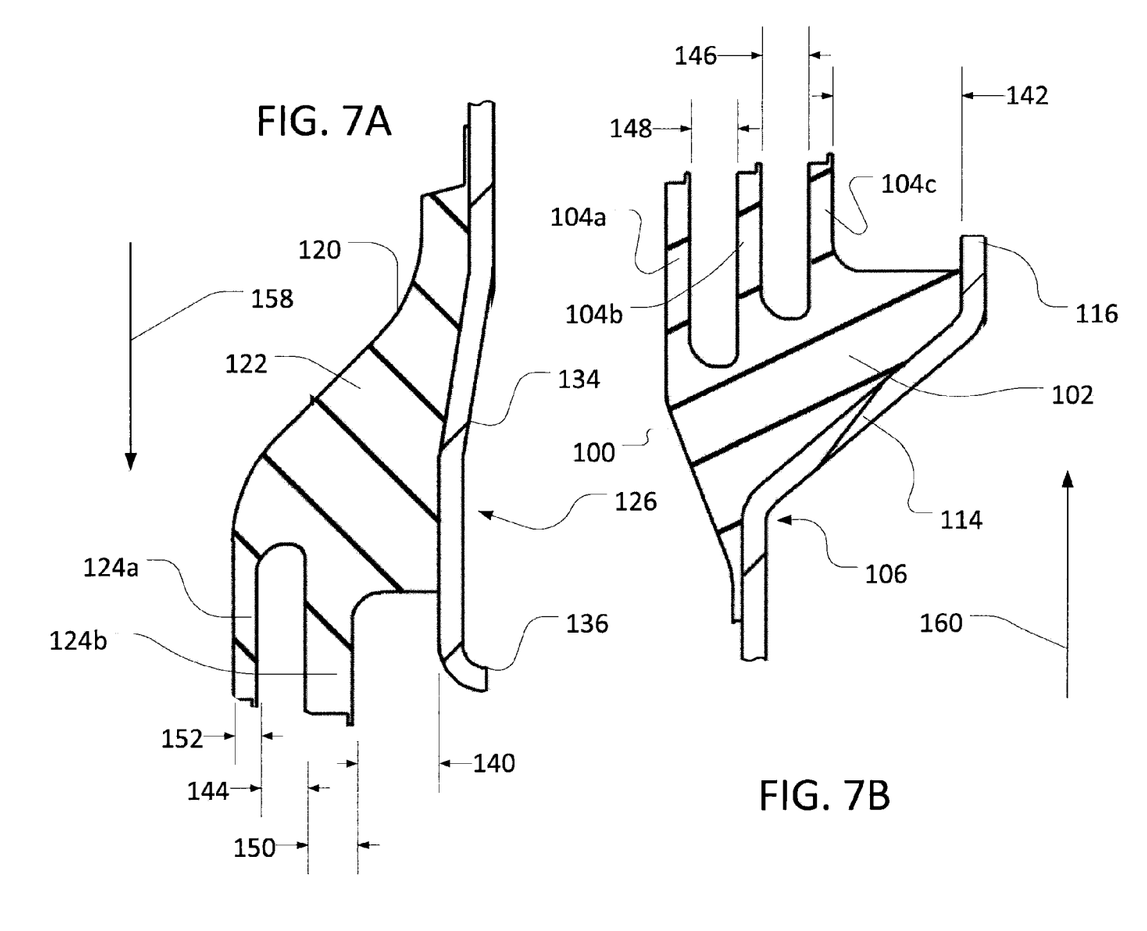
FIG. 7A is an enlarged sectional view of one lip seal of FIG. 6.
FIG. 7B is an enlarged sectional view of another lip seal of FIG. 6.

Referring also to FIGS. 7A and 7B, various aspects of interior 100 and exterior 120 seals are depicted. In order to appropriately seal bearing 40, each of interior 100 and exterior 120 seals may include a plurality of seal lips 104 and 124. One or more of lips 104 and 124 may generally extend away from seal bodies 102 and 122, respectively, in radial directions 158 and 160. It will be understood, however, that other configurations may be possible.

In certain embodiments, the use of differently configured interior 100 and exterior 120 seals, as depicted in FIGS. 6 and 7 may contribute to an optimal balance between relatively high protection from contamination (and lubrication leakage) and relatively low drag on the rotation of sleeve 50. For example, In certain embodiments, interior seal 100 may include a greater number of lips 104 than the number of lips 124 included on exterior seal 120. As depicted, for example, interior seal 100 may include three lips 104*a*, 104*b*, and 104*c*, whereas exterior seal 120 may include two lips 124*a* and 124*b*. Other configurations may also be possible, including configurations in which the number of lips 124 is the same as, or exceeds, the number of lips 104.

Other aspects of interior 100 and exterior 120 seals may additionally (or alternatively) differ. For example, width 140 between exterior backing 126 and seal lip 124*b* may be smaller than (or otherwise differ from) width 142 between interior backing 106 and seal lip 104*c*. In certain embodiments, width 144 between seal lips 124*a* and 124*b* may be smaller than (or otherwise differ from) width 146 between seal lips 104*b* and 104*c*, or width 148 between seal lips 104*a* and 104*b*. Similarly, widths 146 and 148 may be the same or may differ by various amounts. In certain embodiments, width 150 of seal lip 124*b* may be larger than width 152 of seal lip 125*a* (as may be also seen, for example, in wheel bearing seals).

In certain embodiments, the radial extension of various seal lips 124 and 104 may also vary. For example, seal lip 124*b* may extend farther along radially inward direction 158 than does seal lip 124*a*, such that seal lip 124*b* deforms to a greater extent than seal lip 124*a* as the seal lips 124*a* and 124*b* press into surface 66*b* (see FIG. 6). As another example, seal lips 104*a*, 104*b* and 104*c* may extend progressively farther along radially outward direction 160, such that seal lips 104*a*, 104*b* and 104*c* are deformed to successively greater extents as the lips 104*a*, 104*b* and 104*c* press into surface 64*a* (see FIG. 6).

Figures 8A, 8B, 8C:
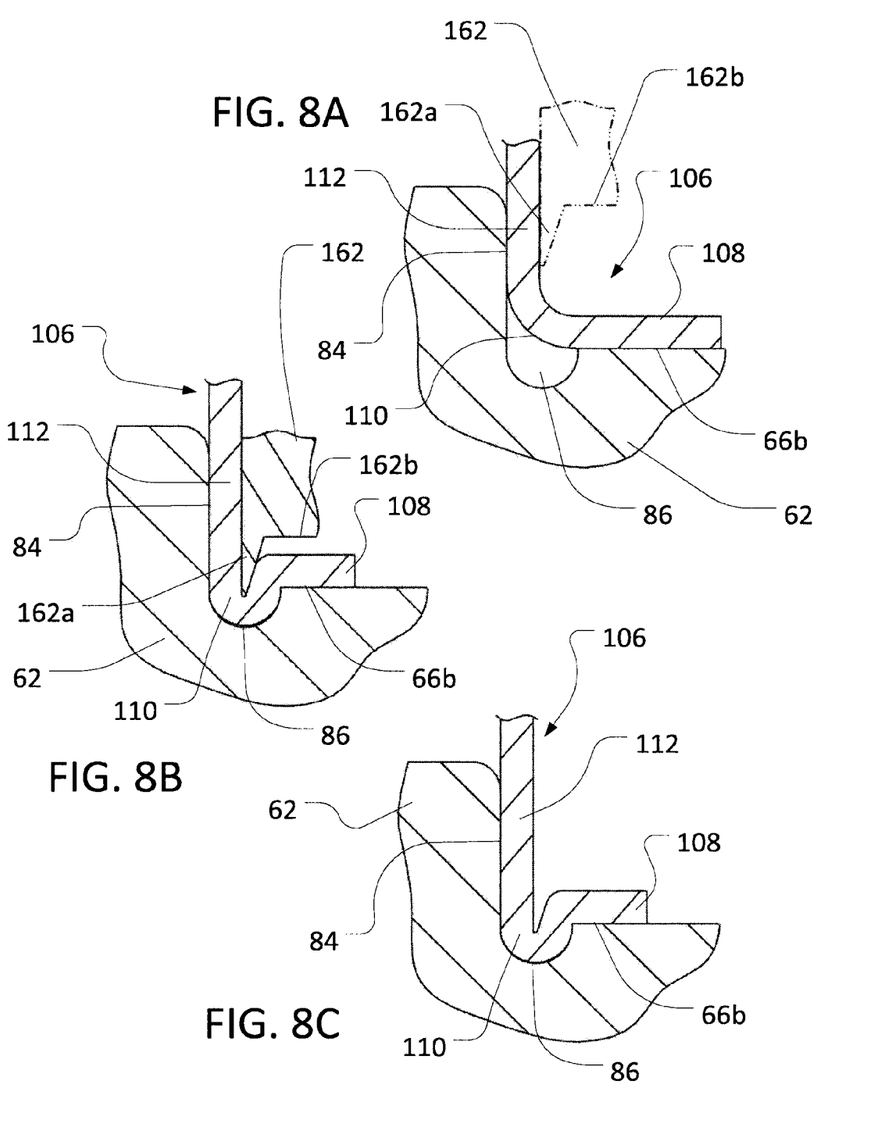
FIGS. 8A-8C are enlarged sectional view of the region D-D of FIG. 6, with a portion of the seal assembly undergoing an installation process.

Referring also to FIGS. 8A-8C, an example installation process for interior backing 106 is depicted. (It will be understood that a similar process may be implemented with respect to exterior backing 126.) Referring in particular to FIG. 8A, staking tool 162 (or another installation tool) may be provided, which may include generally pointed working end 162*a* and shoulder 162*b*. At the start of installation interior backing 106 may be slid into place with respect to inner ring 62 of bearing 40 such that contact portion 112 is seated against shoulder 84 and engagement portion 108 provides a press-fit connection with surface 66*b*. Working end 162*a* of staking tool 162 may then be urged against deformable portion 110 of engagement portion 108 such that, as depicted in FIG. 8B, portion 110 is deformed to protrude into groove 86 on inner ring 62. As depicted in FIG. 8C, staking tool 162 may then be removed, with deformable portion 110 remaining within groove 86 to assist in securing interior backing 106 to inner ring 62.

It will be understood that other configurations may be possible. In certain embodiments, deformable portion 110 may not necessarily be deformed or may not be deformed to extend completely into groove 86. For example, in certain embodiments, it may be sufficient for 50% (or more) of groove 86 (or a similar feature) to be filled by deformable portion 110 in order to provide an appropriate retaining force for interior backing 106. In certain embodiments, as noted above, no groove 86 and no deformable portion 110 (or, referring to FIG. 6, no groove 82 and no deformable portion 130) may be provided.

Figure 9:
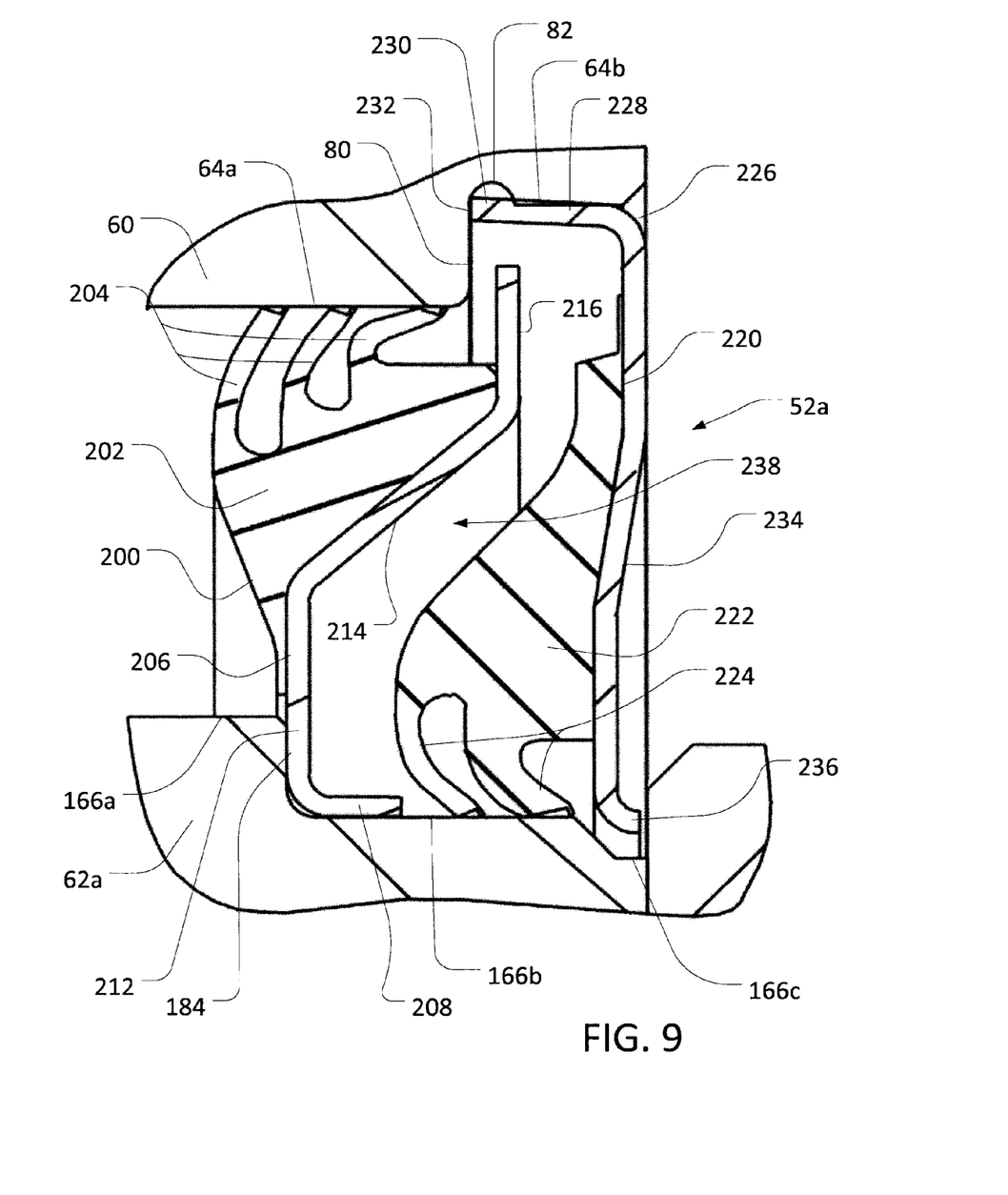
FIG. 9 is a sectional view similar to the sectional view of FIG. 6, depicting an alternate configuration of a seal assembly.

Referring also to FIG. 9, another example seal assembly is depicted including alternative seal set 52*a*. As depicted, interior seal 200 may be generally similar to interior seal 100 (FIGS. 6 and 7) and may include seal body 202 and three radially extending seal lips 204. Likewise, exterior seal 220 may be generally similar to exterior seal 120 (FIGS. 6 and 7) and may include seal body 222 and two radially extending seal lips 224. Finally, outer ring 60 may be configured as in FIG. 6 and inner ring 62a may be configured similarly to inner ring 62 (FIG. 6), with shoulder 184, surfaces 166a and 166b, and groove 166c. However, where shoulder 184 separates surface 166a from surface 166b, no groove may be provided in inner ring 62a (e.g., as compared to groove 86 in inner ring 62).

Interior backing 206 and exterior backing 226 may also be generally similar to interior backing 106 and exterior backing 126, and may include engagement portions 208 and 228, contact portions 212 and 232, seal-mount portions 214 and 234, and free ends 216 and 236. However, no deformable portion may be included on interior backing 206, and deformable portion 230 of exterior backing 226 may simply be the interior end of engagement portion 228. Further, contact portion 232 of exterior backing 226 may include only the interior axial face of engagement portion 228 and seal-mount portion 234 may extend away from the exterior end of engagement portion 228. In certain embodiments, this may facilitate free end 216 of interior backing 206 extending radially outward past surface 64a of outer ring 60, in close proximity to shoulder 80, in order to provide still another barrier to contamination.

The various embodiments described herein may present a particular seal or seal backing as attaching to one portion of a bearing and extending toward another portion of the bearing. For example, various exterior backings may be presented as engaging an outer ring of a bearing, with the associated exterior seals correspondingly providing a contact seal with the inner ring of the bearing. Likewise, various interior backings may be presented as engaging an inner ring of a bearing, with the associated interior seals correspondingly providing a contact seal with the outer ring of the bearing. It will be understood, however, that other configurations may be possible. For example, an exterior backing plate may engage the inner ring of the bearing, with the exterior seal correspondingly providing a contact seal with the outer ring of the bearing. Similarly, an interior backing plate may engage the outer ring of the bearing, with the interior seal correspondingly providing a contact seal with the inner ring of the bearing.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A seal assembly for a bearing having a first ring with a first inner surface, a second ring with a second inner surface facing the first inner surface, and at least one bearing member disposed between the first inner surface of the first ring and the second inner surface of the second ring, the seal assembly comprising:
   a first exterior seal attached to a first exterior backing, the first exterior seal including a first plurality of lips having a first configuration, the first exterior backing engaging the first ring to hold the first plurality of lips against the second inner surface of the second ring, the first exterior backing extending away from the first inner surface of the first ring past the second inner surface of the second ring; and
   a first interior seal with a second plurality of lips having a second configuration different from the first configuration, the first interior seal being attached to a first interior backing, the first interior seal and the first interior backing being oriented, at least in part, between the first exterior seal and the at least one bearing member, the first interior backing engaging the second ring to hold the second plurality of lips against the first inner surface of the first ring.

2. The seal assembly of claim 1, wherein the bearing rotatably supports a disc of an agricultural disc gang assembly.

3. The seal assembly of claim 1, wherein the first ring includes a first shoulder, the first exterior backing engaging the first ring through a press-fit connection, with a first contact portion of the first exterior backing seating against the first shoulder.

4. The seal assembly of claim 3, wherein the first ring includes a first groove adjacent to the first shoulder, and the first exterior backing includes a first deformable engagement portion adjacent the first contact portion, the first deformable engagement portion being deformed to extend into the first groove to secure the first exterior backing to the first ring.

5. The seal assembly of claim 1, wherein the second ring includes a second shoulder, the first interior backing engaging the second ring through a press-fit connection, with a second contact portion of the first interior backing seating against the second shoulder.

6. The seal assembly of claim 5, wherein the second ring includes a second groove adjacent to the second shoulder and the first interior backing includes a second deformable engagement portion adjacent the second contact portion, the second deformable engagement portion being deformed to extend into the second groove to secure the first interior backing to the second ring.

7. The seal assembly of claim 1, wherein the first interior backing extends away from the second inner surface of the second ring past the first inner surface of the first ring.

8. The seal assembly of claim 1, wherein the first exterior seal includes a first annular body portion, the first plurality of lips extending away from the first annular body portion to contact the second inner surface of the second ring; and
   wherein the first interior seal includes a second annular body portion, the second plurality of lips extending away from the second annular body portion to contact the first inner surface of the first ring.

9. The seal assembly of claim 8, wherein the first plurality of lips of the first exterior seal includes fewer lips than the second plurality of lips of the first interior seal.

10. The seal assembly of claim 8, wherein at least a first lip included in the first plurality of lips of the first exterior seal is thicker, along an axial direction from the perspective of the bearing, than at least a second lip included in the second plurality of lips of the first interior seal.

11. A seal assembly for a bearing having a first ring with a first inner surface, a second ring with a second inner surface facing the first inner surface, and at least one bearing member disposed between the first inner surface of the first ring and the second inner surface of the second ring, the seal assembly comprising:
- a first exterior seal attached to a first exterior backing, the first exterior backing including a first annular body engaging the first ring with a press-fit connection to hold the first exterior seal against the second inner surface of the second ring, the first annular body of the first exterior backing extending away from the first inner surface of the first ring past the second inner surface of the second ring; and
- a first interior seal attached to a first interior backing, the first interior backing being oriented between the first exterior seal and both the first interior seal and the at least one bearing member, the first interior backing including a second annular body engaging the second ring with a press-fit connection to hold the first interior seal against the first inner surface of the first ring.

12. The seal assembly of claim 11, wherein the bearing rotatably supports a disc of an agricultural disc gang assembly.

13. The seal assembly of claim 11, wherein the first ring includes a first shoulder separating the first inner surface into a first portion and a second portion, the first portion being farther from the second inner surface than the second portion; and
   wherein a first contact portion of the first exterior backing seats against the first shoulder when the first exterior backing engages the first ring.

14. The seal assembly of claim 13, wherein the first portion of the first inner surface includes a first groove adjacent to the first shoulder, and the first exterior backing includes a first deformable engagement portion adjacent the first contact portion, the first deformable engagement portion being deformed to extend into the first groove to secure the first exterior backing to the first ring.

15. The seal assembly of claim 11, wherein the second ring includes a second shoulder separating the second inner surface into a first portion and a second portion, the first portion being farther form the first inner surface than the second portion; and
   wherein a second contact portion of the first interior backing seats against the second shoulder when the first interior backing engages the second ring.

16. The seal assembly of claim 15, wherein the first portion of the second inner surface includes a second groove adjacent to the second shoulder, and the first interior backing includes a second deformable engagement portion adjacent the second contact portion, the second deformable engagement portion being deformed to extend into the second groove to secure the first interior backing to the second ring.

17. The seal assembly of claim 11, wherein the first interior backing extends away from the second inner surface of the second ring past the first inner surface of the first ring.

18. The seal assembly of claim 11, wherein the first exterior seal includes a first set of one or more lips extending away from the first annular body portion to contact the second inner surface of the second ring; and
   wherein the first interior seal includes a second set of one or more lips extending away from the second annular body portion to contact the first inner surface of the first ring.

19. The seal assembly of claim 18, wherein the first set of lips of the first exterior seal includes two or fewer lips and the second set of lips of the first interior seal includes three or more lips.

20. The seal assembly of claim 18, wherein at least a first lip included in the first plurality of lips is thicker, along an axial direction from the perspective of the bearing, than at least a second lip included in the second plurality of lips.

* * * * *